UNITED STATES PATENT OFFICE.

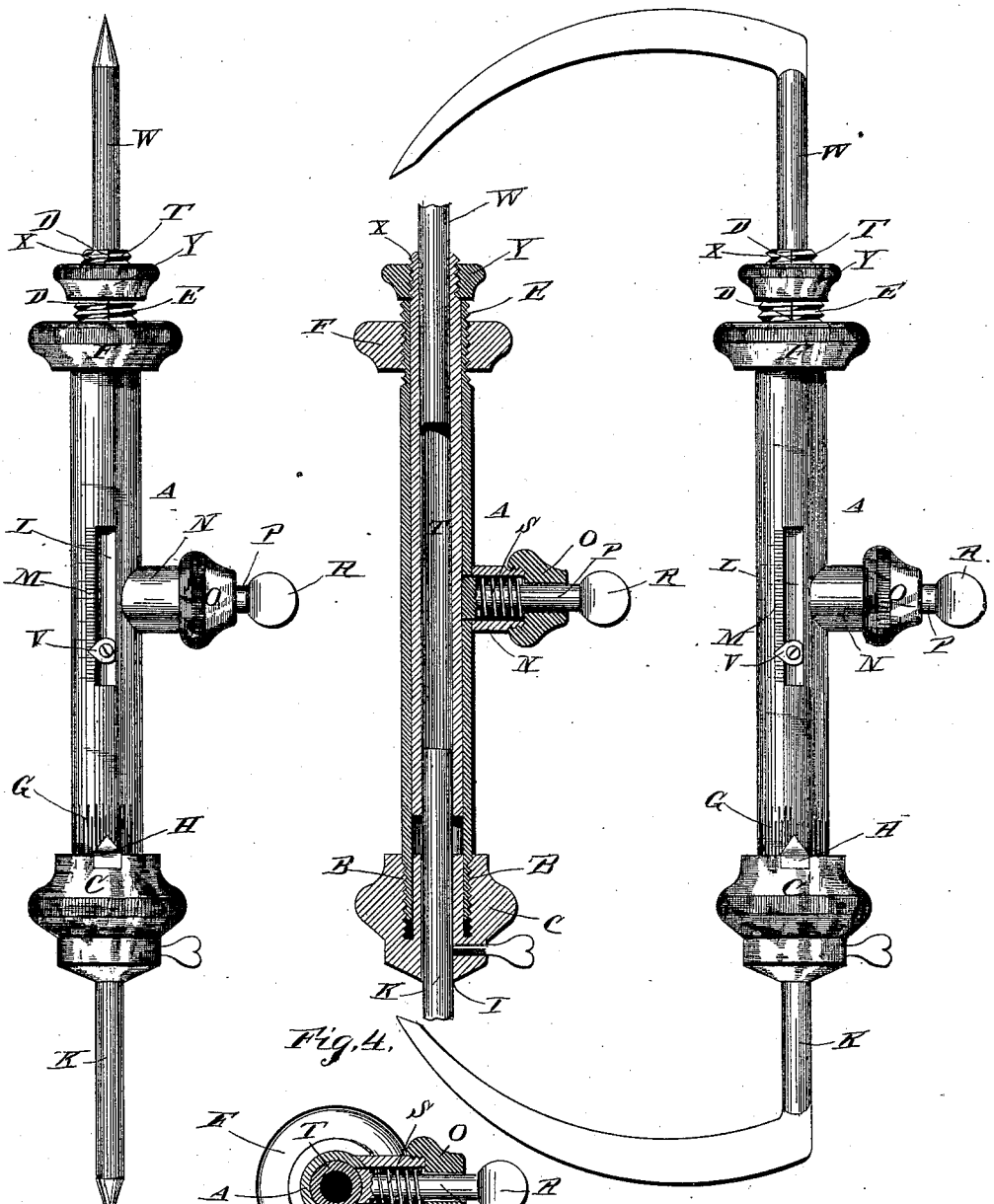

JOHN TICKELL, OF CLEVELAND, OHIO.

CALIPER-GAGE.

SPECIFICATION forming part of Letters Patent No. 359,295, dated March 15, 1887.

Application filed October 22, 1886. Serial No. 216,959. (No model.)

*To all whom it may concern:*

Be it known that I, JOHN TICKELL, a citizen of the United States, residing at Cleveland, in the county of Cuyahoga and State of Ohio, have invented a new and useful Improvement in Caliper-Gages, of which the following is a specification.

My invention relates to an improvement in caliper-gages for inside and outside measurements; and it consists in the peculiar construction and combination of devices, that will be more fully set forth hereinafter, and particularly pointed out in the claims.

In the drawings, Figure 1 is a side elevation of a caliper-gage embodying my improvements adapted for inside measurements. Fig. 2 is a similar view of the same when adapted for outside measurements. Fig. 3 is a longitudinal sectional view of the same. Fig. 4 is a transverse sectional view taken on the line $x$ $x$ of Fig. 1.

A represents a hollow tube, which is provided at its lower end with screw-threads B, adapted to receive a nut, C. The upper end of the tube A is provided with longitudinal kerfs D, thereby forming clamping-arms, which are provided with screw-threads E. An annular collar or nut, F, fits the said threads, and is adapted to clamp the arms together. The lower end of the tube A, on which the nut C is screwed, is provided with a circumferential scale, G, which is graduated to any desired fractional part of an inch or other unit of measure, and the nut C is provided with a pointer, H, which sweeps around the said scale when the nut is turned. On the lower side of the said nut is made a recess, I, adapted to receive an arm or pointer, K.

In one side of the tube A, at a suitable distance from the lower end thereof, is a longitudinal slot, L, which is provided on one side with a graduated scale, M. From one side of the said tube A projects a cylindrical sleeve, N, having a screw-cap, O, which fits on its outer end. In the said sleeve is located a plunger or piston, P, the rod of which extends through an opening which is made in the center of the screw-cap, and is provided at its outer end with a head, R.

S represents a spring which is coiled around the piston-rod, and bears between the piston and the screw-cap, the function of the said spring being to normally force the piston inwardly in the sleeve.

T represents a cylindrical arm, which fits in the tube A, and may be clamped therein at any desired adjustment by turning the nut F. The said arm T has a pointer or index, V, which works in the slot L and sweeps over the scale M. In the upper end of the arm T is made a longitudinal recess, which forms the socket for an arm or pointer, W. The upper end of the said arm T is also provided with longitudinal kerfs, thereby forming clamping-arms provided with screw-threads X. An annular nut or collar, Y, fits on the said screw-threads, and is adapted to compress the clamping-arms against the arm or pointer W, so as to secure the latter in the recess or socket at any desired adjustment. When taking inside measurements, the form of arms shown in Fig. 1 are attached to the device; but for outside measurements I use the caliper-arms shown in Fig. 2. The said arms are interchangeable, and can be attached or detached in a very short space of time.

In order to take a measurement, the nut F is loosened sufficiently to permit the arm T to slide freely in the tube A, and the said arm is then moved in the tube until the points W and K come in contact with opposite sides of the object or diameter that is being measured. The spring-actuated plunger bears normally against the arm T, so as to secure the same in the tube A at any adjustment. When the said arm T is moved to the necessary extent in making the measurement, the person using the gage notes the point of the scale M with which the index V aligns, and he then tightens the nut F on the upper end of the screw, so as to clamp the extensible arm firmly therein, and prevent the latter from moving when the gage is withdrawn from the object or opening.

By means of the graduated scale G and the nut C, having the index H, measurements may be made with precision to any desired fractional part of an inch or other unit of measure, no matter how small, thus adapting the caliper-gage for use in making measurements with great nicety and exactness.

Having thus described my invention, I claim—

1. The combination of the tube A, having the point or arm K and the scale M, and the sliding arm T in the tube A, and having the index V, to sweep over the scale M, the outer end of the said sliding arm having the point or arm W, substantially as described.

2. In a caliper-gage, the combination of the tube A, having the scale M, the extensible arm T in the said tube, and having the index V, to work over the scale M, and the catch to secure the extensible arm at any adjustment in the tube, substantially as described.

3. In a caliper-gage, the combination of the tube A, having the circumferential scale G, the nut C, provided with the index H, to sweep over the said scale, and the longitudinal scale M, the arm T, to work in the tube A, and having the index V, to sweep over the scale M, and devices, substantially as described, to secure the said arm at any adjustment in the tube, for the purpose set forth, substantially as described.

4. The combination of the tube A, having the spring-actuated catch P, the longitudinal slot L, the graduated scale M on one side of the said slot, and the circumferential scale G at one end of the tube, with the nut C screwed on one end of the tube, and having the index H to sweep over the scale G, the said nut forming a socket for the arm or point K, the arm T in the tube, having the index V, projecting through a slot, L, and working on the scale M, the said arm T forming a socket or clamp for the arm or point W, and the clamping-nut F, to secure the arm T to the tube at any adjustment, substantially as described.

5. The tube A, in combination with the extensible arm T, the point or arm W, carried by the arm T, the point or arm K on the tube A, a brake device pressing against arm T, and a clamping device to subsequently clamp the arm T in the position held by the brake device, as set forth.

6. In combination with the tube A, the nut C at one end, the arm or point K, held in place by the nut C, the tubular arm T within tube A, the arm or point W in tubular arm T, and the nut Y, clamping the arm or point W, as set forth.

In testimony that I claim the foregoing as my own I have hereto affixed my signature in presence of two witnesses.

JOHN TICKELL.

Witnesses:
GEO. W. McDONALD,
OSMON CARD.